United States Patent
Gailloux et al.

(10) Patent No.: US 8,924,287 B1
(45) Date of Patent: Dec. 30, 2014

(54) SYSTEM AND METHODS FOR MOBILE ELECTRONIC FUNDS TRANSFERS

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

(21) Appl. No.: 13/213,047

(22) Filed: Aug. 18, 2011

(51) Int. Cl.
*G06Q 40/00* (2012.01)

(52) U.S. Cl.
USPC .......................................................... 705/39

(58) Field of Classification Search
USPC .......................................................... 705/39
See application file for complete search history.

(56) References Cited

U.S. PATENT DOCUMENTS

| | | | |
|---|---|---|---|
| 7,711,638 B2 * | 5/2010 | Michelsen et al. | 705/39 |
| 8,249,965 B2 * | 8/2012 | Tumminaro | 705/35 |
| 2002/0138424 A1 * | 9/2002 | Coyle | 705/39 |
| 2003/0167237 A1 * | 9/2003 | Degen et al. | 705/64 |
| 2005/0209958 A1 * | 9/2005 | Michelsen et al. | 705/39 |
| 2006/0019632 A1 * | 1/2006 | Cunningham et al. | 455/408 |
| 2007/0011089 A1 * | 1/2007 | DeSchryver | 705/39 |
| 2007/0244811 A1 * | 10/2007 | Tumminaro | 705/39 |
| 2007/0255620 A1 * | 11/2007 | Tumminaro et al. | 705/14 |
| 2009/0319425 A1 * | 12/2009 | Tumminaro et al. | 705/42 |

* cited by examiner

*Primary Examiner* — Lindsay M. Maguire (57) ABSTRACT

A method of electronically transferring funds comprising receiving by an application executing on a computer payment card information associated with a payment card and a portable electronic device. The method also comprises receiving by the application a request from the portable electronic device to electronically transfer funds. The method also comprises sending by the application to the portable electronic device identification of entities that have the capability of receiving the electronic funds based on the payment card information.

19 Claims, 7 Drawing Sheets

FIG. 8

US 8,924,287 B1

SYSTEM AND METHODS FOR MOBILE ELECTRONIC FUNDS TRANSFERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of portable electronic devices may utilize a variety of different services such as web services or other data services, voice call services, and short message service (SMS—also known as text messaging). These services may be offered by a communication service provider of portable electronic devices. Service providers may offer one or more of phone service, internet service, text messaging service, and/or other portable electronic device communication services, and may bundle more than one of these services. The bundle of services may be referred to as a service plan or device plan. The device plan may be provided as a post-pay billing system, such that a user is billed for services already provided. For example, a user may be billed at the end of a month for the services they have used in that month. Alternatively, services may be prepaid, such that a user pays for an amount of service, which may be applied as a credit to the user's account. The user may then utilize the service until the amount of prepaid service is consumed. Then, if desired, the user may buy additional service credit in a variety of increments or units. A data plan, for example, may be purchased as a number of bits or unlimited data for a specified period of time.

SUMMARY

In an embodiment, a method of electronically transferring funds is disclosed. The method comprises receiving by an application executing on a computer payment card information associated with a payment card and a portable electronic device. The method also comprises receiving by the application a request from the portable electronic device to electronically transfer funds. The method also comprises sending by the application to the portable electronic device identification of entities that have the capability of receiving the electronic funds based on the payment card information.

In an embodiment, a method of electronically transferring funds is disclosed. The method comprises receiving by an application executing on a computer a request from a portable electronic device to electronically transfer funds. The method also comprises receiving by the application a country and city to which an electronic transfer of funds is to be made, sending by the application a list of entities in the country and city that are capable of receiving the electronic funds transfer, and receiving by the application an entity to receive the electronic funds transfer.

In an embodiment, a method of electronically transferring funds is disclosed. The method comprises receiving by an application executing on a computer deposit account information associated with a deposit account from a portable electronic device. The method also comprises receiving by the application a photographic image taken by the portable electronic device of the front of a check, receiving by the application an amount of funds to be transferred from an account associated with the check to the deposit account, and validating by the application that the electronic transfer of funds from the account associated with the check to the deposit account should proceed.

In an embodiment, a method of electronically transferring funds is disclosed. The method comprises sending by a portable electronic device an application executing on a computer payment card information associated with a payment card and a portable electronic device, sending by the portable electronic device a request to electronically transfer funds to the application, and receiving by the portable electronic device an identification of entities that have the capability of receiving the electronic funds based on the payment card information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches several methods which may make the transfer of funds easier for mobile service provider customers, including mobile bill paying services, mobile money transfer services, and mobile deposit services. Many customers utilizing portable electronic devices may benefit dramatically through the use of mobile electronic transfers of funds. The mobile electronic transfer of funds makes bill paying, money transferring, and depositing much more convenient for almost all customers.

For prepaid device plan customers, mobile electronic funds transfers may even be more important than for post-pay billing plans. Many prepaid device plan customers do not have access to bank accounts or have the need to quickly make funds transfers. These prepaid device plan customers, however, do have a mechanism for adding funds onto the account balance of their prepaid account plan. Through the use of the methods disclosed herein, mobile service providers may meet the rising demand in the prepaid device plan market for electronic funds transfers, for example by moving some of the positive funds balance of the prepaid account to a billing entity such as a utility company, to a bank account or a funds transfer point-of-presence, or to another location.

More specifically, many prepaid device plan customers currently do not have the capability to easily transfer funds because they do not have a bank account or an account that allows electronic funds transfers, or do not have a mobile device with a network that is capable of allowing the electronic transfer of funds. As disclosed herein, a service provider may provide electronic funds transfer capabilities to any portable electronic device, such as a mobile phone. In an effort to simplify the process for the user, the service provider may automatically provide entities, such as utilities, that have the capability of receiving the funds transfer based on the location of the user, as determined by the address associated with a payment card the user provides, thus providing a managerial user interface.

For example, the user may wish to pay an electric bill electronically. The user then may register a payment card, such as a credit card, with the service provider. The service provider then may automatically send the user, through the user's portable electronic device, a list of utilities that service the area in which the payment card is registered (i.e. the utilities which service the zip code of where the payment card is registered). The user would then only be required to choose the electric company that he wishes to make a payment and the amount of the payment much simplifying the transfer process. The service provider then may electronically transfer the payment to the electric company. This enables fast, reliable bill pay for the entities that the user would most likely need to pay and provides users who have a feature phone, that is not necessarily a smart phone, the capability of electronically transferring funds.

In another method, a user may wish to electronically transfer funds to another individual, such as a family member in a different location. This may be accomplished through the electronic transfer of funds to a business in a location in which the family member has access. In this situation, the user may enter, into his portable electronic device, the city and country for which the funds are to be transferred. The service provider then may send the portable electronic device a list of entities that may receive the funds. The user then would be able to choose the entity for which the funds are to be transferred and the amount of funds to be transferred. The service provider then may transfer the funds to the entity. This provides the user with a choice of locations which the user can easily choose to make the transfer of funds as simple and fast as possible.

In order to meet this demand, methods are disclosed for electronically transferring funds. More specifically, methods in transferring funds to effectuate mobile bill pay services, mobile money transfer services, and mobile deposit services are disclosed.

Figure 1:
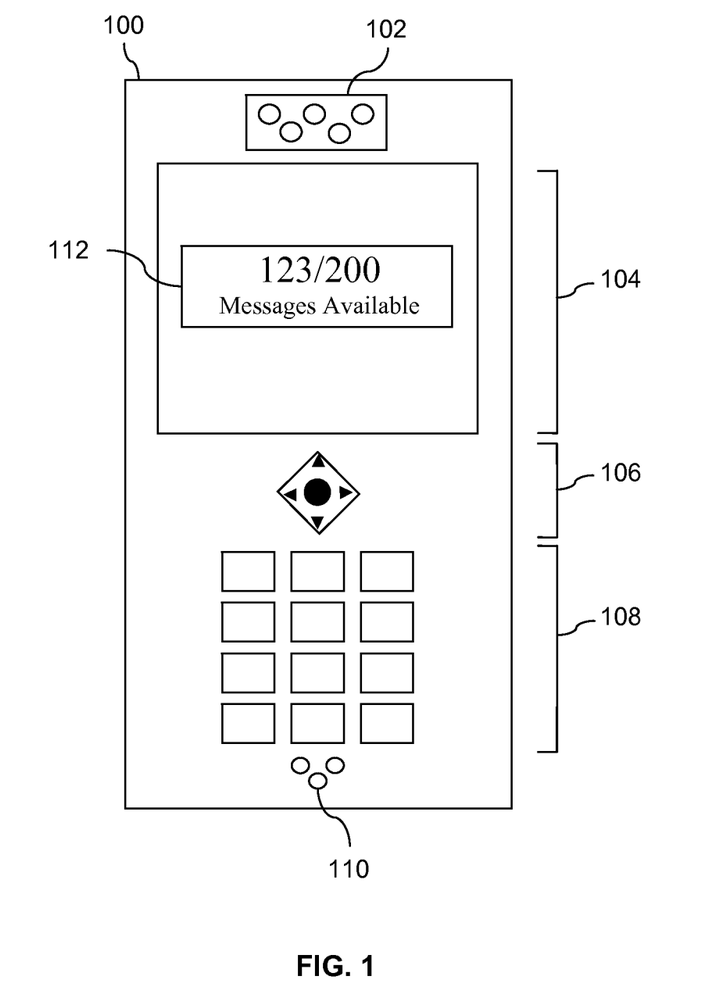
FIG. 1 illustrates a portable electronic device, according to an embodiment of the disclosure.

Now turning to FIG. 1, a portable electronic device 100 is illustrated. The portable electronic device 100 includes a speaker or earpiece 102, a display 104, a button, set of buttons, or touch-sensitive surface 106 for cursor movement or such on the display 104, another touch-sensitive surface and/or keys 108 for input by a user, and a microphone 110. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. Additionally, the portable electronic device 100 may be programmed and/or configured over-the-air, for example from a wireless base station, a wireless access point, or a peer portable electronic device 100. FIG. 1 also depicts a message 112, which will be discussed in more detail hereinafter.

Figure 2:
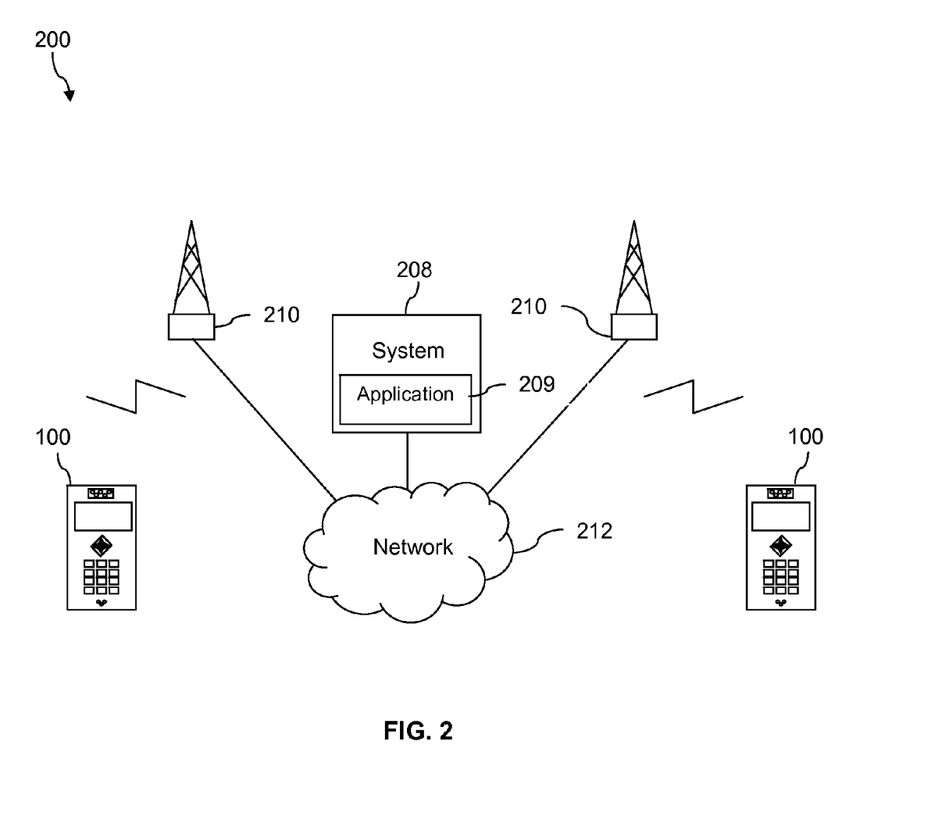
FIG. 2 illustrates a communication system, according to an embodiment of the disclosure.

FIG. 2 shows a wireless communications system 200 including the portable electronic device 100. FIG. 2 depicts the portable electronic device 100, which is operable for implementing aspects of the present disclosure, but the present disclosure should not be limited to these implementations. In FIG. 2, two portable electronic devices 100 are depicted in order to illustrate communication from one portable electronic device to another, wherein each may be the same or similar. For the purposes of this disclosure, whether the hardware and software of the two portable electronic devices 100 are identical or not, their basic functions may be considered to be the same.

Though illustrated as a mobile phone, the portable electronic device 100 may take various forms including a wireless handset, a pager, a personal digital assistant (PDA), a gaming device, or a media player. The portable electronic device 100 may execute a web browser application which enables the display 104 to show a web page. The web page may be obtained via wireless communications with a base transceiver station (BTS) 210, a peer portable electronic device 100 or any other wireless communication network or system. Two base transceiver stations 210 are illustrated, and it should be understood that the wireless communication system may comprise additional base transceiver stations, which may or may not comprise identical hardware, but whose functions may be considered to be the same. The portable electronic device 100 may access the base transceiver stations 210 through a peer portable electronic device 100 acting as an intermediary, in a relay type or hop type of connection. In some instances, the portable electronic device 100 may be in communication with multiple base transceiver stations 210 at the same time. The base transceiver station 210 is coupled to a network 212. The network 212 may comprise a combination of public and private networks. The network 212 may comprise both wired communication links and wireless communication links. The network 212 may comprise, in part, the Internet. Via the link to the network 212, the base transceiver stations 210 may be connected to another system, such as system 208.

The system 208 may be, for example, a server of a service provider and may include one or more processors. The system 208 may execute an application 209. The application 209, along with the system 208, may be configured to communicate information, such as information pertaining to the account of the user of the portable electronic device 100, between the service provider and the user of the portable electronic device 100. The portable electronic device 100 may access the system 208 through the network 212, through the base transceiver stations 210.

In an embodiment, portable electronic device 100 may be configured by a user (also referred to as a customer of a wireless communication service provider, or merely as a customer) with a device plan. The device plan is the plan for which the portable electronic device 100 may access the network 212. In some embodiments, the device plan may be a prepaid mobile service plan.

In an embodiment, the application 209 is configured to facilitate the electronic transfer of funds. In an embodiment, the electronic transfer of funds may take the form of an electronic bill payment system. The application 209 may be configured to receive payment card information associated with a payment card and portable electronic device 100. A payment card may include a credit card, debit card, reloadable card, or something similar. In alternative embodiments, the application 209 may receive deposit account information, such as checking or savings account information that is associated with portable electronic device 100.

In an embodiment, application 209 receives a request from portable electronic device 100 to electronically transfer funds. The application 209 then may send to portable electronic device 100 a list of entities that have the capability of receiving the electronic funds based on the payment card information. The payment card information may include the physical address of the account associated with the payment card or the zip code associated with the payment card. The payment card information may change over time, such that when a user moves from one location to another, the payment card information may be updated to account for the change in location. Thus, although the phone may contain an area code associated with one area, the entities presented to the user may be from an entirely different area, the area associated with the payment card information.

Thus, in an embodiment, the portable electronic device 100 is sent by the application 209 a list of entities that may receive electronic funds based on the address of the account holder of the payment card or the zip code of the account holder of the payment card. The entities that may be sent to the portable electronic device 100 may be any business, individual, or group of individuals that accepts electronic bill payments. Thus, in an embodiment, application 209 may send portable electronic device 100 a list of local billers, such as a local utility company, that may accept payment electronically. By sending portable electronic device 100 a list of entities based on the address or zip code of the account holder, it is likely that a local biller would be presented to the user of portable electronic device 100 for fast, reliable bill pay for the entities that the user would most likely need to pay.

As the payment card information or deposit account information may be associated with the portable electronic device 100, application 209 may store the payment card information in memory to be used in future transactions in which portable electronic device 100 makes a request to electronically transfer funds. In this embodiment, application 209 would associate all electronic funds transfers that are associated with portable electronic device 100 with the payment card information stored in memory. This enables a user of portable electronic device 100 to register a payment card with their mobile service provider once for future electronic payment transactions.

In an embodiment, application 209 receives account information related to one of the entities that was sent to portable electronic device 100 from portable electronic device 100. This may be an account number for the entity associated with the user of portable electronic device 100. In an embodiment, application 209 then may electronically send the funds associated with the payment card and the account information associated with the entity to the entity. That is, application 209 may send the funds from the payment card to the entity selected by the user of the portable electronic device 100 along with the user's account information with the entity.

In an embodiment, application 209 may send portable electronic device 100 periodic reminder messages based on past electronic fund transfers. In an embodiment, periodic reminder messages would be 21 days, or some other amount of time prior to a typical monthly billing cycle. In an embodiment the messages would be text messages, voice messages, or e-mails. This enables the application to send the user of portable electronic device 100 reminders that previous payments have been made and that a new payment may be coming due. This may be very useful to a user in attempting to prevent any late payments.

In an embodiment, the electronic transfer of funds may take the form of a money transfer. In an embodiment, application 209 may receive a request from portable electronic device 100 to electronically transfer funds. Application 209 may also receive a country and city to which an electronic transfer of funds is to be made from portable electronic device 100.

In an embodiment, the application 209 may send a list of entities in the country and city that is to receive the electronic funds transfer that are capable of receiving the funds. The application 209 then may receive from the portable electronic device 100 a selection of the entity to receive the electronic funds transfer. Thus, application 209 may send a list of entities in the country and city that the user has chosen to receive the funds, and then the user may select from the list the entity to which the funds are to be transferred. In an alternative embodiment, application 209 may receive the entity in which the user requests the funds to be transferred from portable electronic device 100 along with the country and city to which the funds are to be transferred without sending a list of entities to the portable electronic device 100.

In an embodiment, application 209 may receive an amount of funds that are to be electronically transferred from portable electronic device 100. That is, after the user has selected which entity is to be transferred the funds, the user may then enter the amount of funds to be transferred into portable electronic device 100 which would send the information to application 209.

In an embodiment, payment card information associated with a payment card and a portable electronic device may be received by the application 209. Electronic funds associated with the payment card then may be sent by the application 209 to the entity that the user has selected to receive the funds. In an alternative embodiment, the application 209 may send the entity that the user has selected to receive the funds and the amount of funds that are to be electronically transferred to a money transfer agent, such as Western Union for processing of the transaction.

In an embodiment, the electronic transfer of funds may take the form of a deposit. In an embodiment, application 209 may receive deposit account information associated with a deposit account from portable electronic device 100. In an alternative embodiment, application 209 may receive any other account information in to which a check may be posted or deposited such as a reloadable card, credit card, or debit card.

In an embodiment, application 209 may receive identity information associated with the user of portable electronic device 100. This information may include address of the user and other identifying information. A service then may perform a background check on the identifying information as a fraud prevention measure.

In an embodiment, application 209 receives a photographic image taken by portable electronic device 100 of the front of a check that is to be deposited. In an alternative embodiment, the photographic image of the check may be taken by any camera and stored on portable electronic device 100. Application 209 then may receive the photographic image of the check. The photographic image of the front of the check may include the account number and the routing number of the financial institution associated with the check to enable processing of the transaction.

In an embodiment, application 209 receives an amount of funds to be transferred from an account associated with the check to the deposit account. That is, application 209 may receive the amount listed on the check that will be deposited from the account associated with the check into the deposit account. In an embodiment, application 209 may then validate that the electronic transfer of funds from the account associated with the check to the deposit account should proceed. This may be done in an attempt to prevent fraudulent transactions.

In an embodiment, application 209 may transfer the funds from the account associated with the check to the deposit account. In alternative embodiments, a separate service may be used to transfer the funds from the account associated with the check to the deposit account with the application 209 providing the service the image of the check and the amount to be deposited.

By effectuating these methods, a mobile service provider is providing its customers a fast, reliable, and convenient way to electronically transfer funds in a mobile environment. This may be valuable to the mobile service provider for numerous reasons. This service may provide an incentive for customers to remain in a device plan for portable electronic device 100 because the customers enjoy the service. This is especially true of prepaid device plan customers. This service may also provide a large revenue stream for the mobile service provider as it may be able to receive up to $2 per transaction. With the possibilities of millions of transactions yearly, the mobile service provider could stand to reap millions of dollars in additional revenue.

Figure 3:
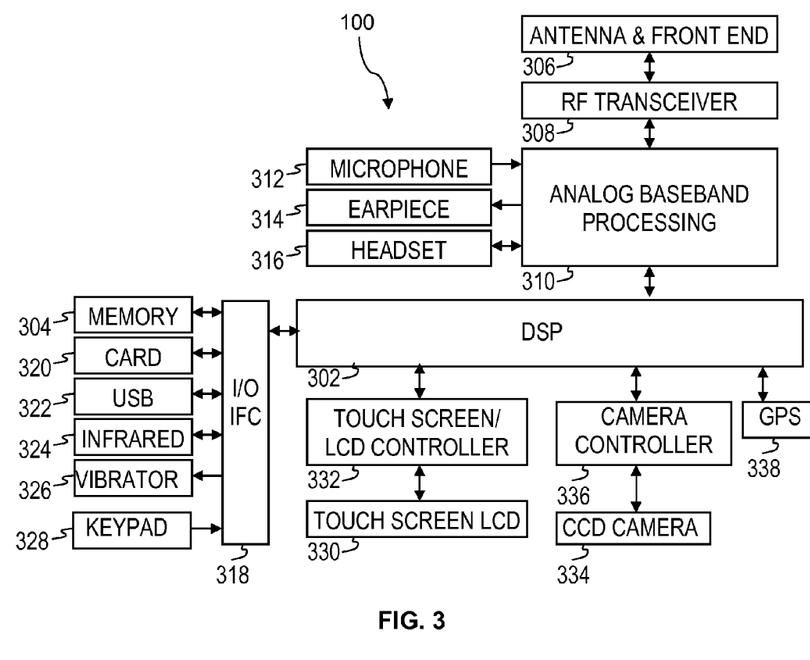
FIG. 3 is a block diagram of a portable electronic device, according to an embodiment of the disclosure.

FIG. 3 shows a block diagram of the portable electronic device 100. While a variety of known components of portable electronic devices 100 are depicted, in an embodiment a subset of the listed components and/or additional components not listed may be included in the portable electronic device 100. The portable electronic device 100 includes a digital signal processor (DSP) 302 and a memory 304. As shown, the portable electronic device 100 may further include an antenna and front end unit 306, a radio frequency (RF) transceiver 308, an analog baseband processing unit 310, a microphone 312, an earpiece 314, a headset port 316, an input/output interface 318, a removable memory card 320, a universal serial bus (USB) port 322, an infrared port 324, a vibrator 326, a keypad 328, a touch screen liquid crystal display (LCD) with a touch sensitive surface 330, a touch screen/LCD controller 332, a charge-coupled device (CCD) camera 334, a camera controller 336, and a global positioning system (GPS) sensor 338. In an embodiment, the portable electronic device 100 may include another kind of display that does not provide a touch sensitive screen. In an embodiment, the DSP 302 may communicate directly with the memory 304 without passing through the input/output interface 318. Additionally, in an embodiment, the portable electronic device 100 may comprise other peripheral devices that provide other functionality.

The DSP 302 or some other form of controller or central processing unit operates to control the various components of the portable electronic device 100 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the portable electronic device 100 to function as a peripheral device to exchange information with a personal computer or other computer system. The infrared port 324 and other optional ports such as a Bluetooth® interface or an IEEE 802.11 compliant wireless interface may enable the portable electronic device 100 to communicate wirelessly with other nearby handsets and/or wireless base stations.

The keypad 328 couples to the DSP 302 via the interface 318 to provide one mechanism for the user to make selections, enter information, and otherwise provide input to the portable electronic device 100. Another input mechanism may be the touch screen LCD 330, which may also display text and/or graphics to the user. The touch screen LCD controller 332 couples the DSP 302 to the touch screen LCD 330. The GPS sensor 338 is coupled to the DSP 302 to decode global positioning system signals, thereby enabling the portable electronic device 100 to determine its position.

Figure 4:
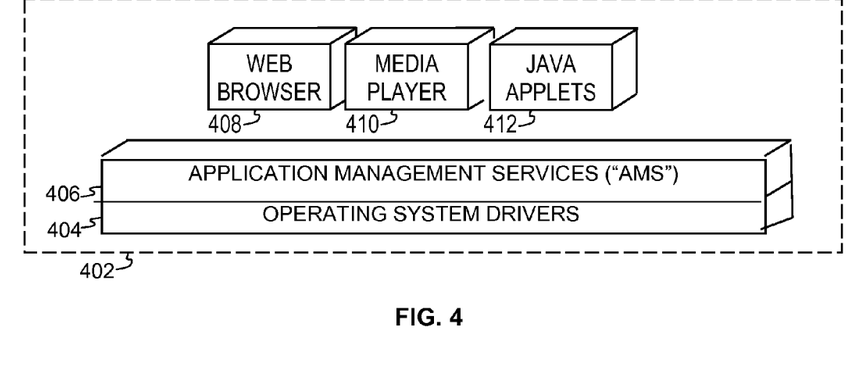
FIG. 4 is a block diagram of software architecture of a portable electronic device, according to an embodiment of the disclosure.

FIG. 4 illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services ("AMS") 406 that transfer control between applications running on the portable electronic device 100. Also shown in FIG. 4 are a web browser application 408, a media player application 410, and JAVA applets 412. The web browser application 408 configures the portable electronic device 100 to operate as a web browser, allowing a user to enter information into forms and select links to retrieve and view web pages. The media player application 410 configures the portable electronic device 100 to retrieve and play audio or audiovisual media. The JAVA applets 412 configure the portable electronic device 100 to provide games, utilities, and other functionality.

Figure 5:
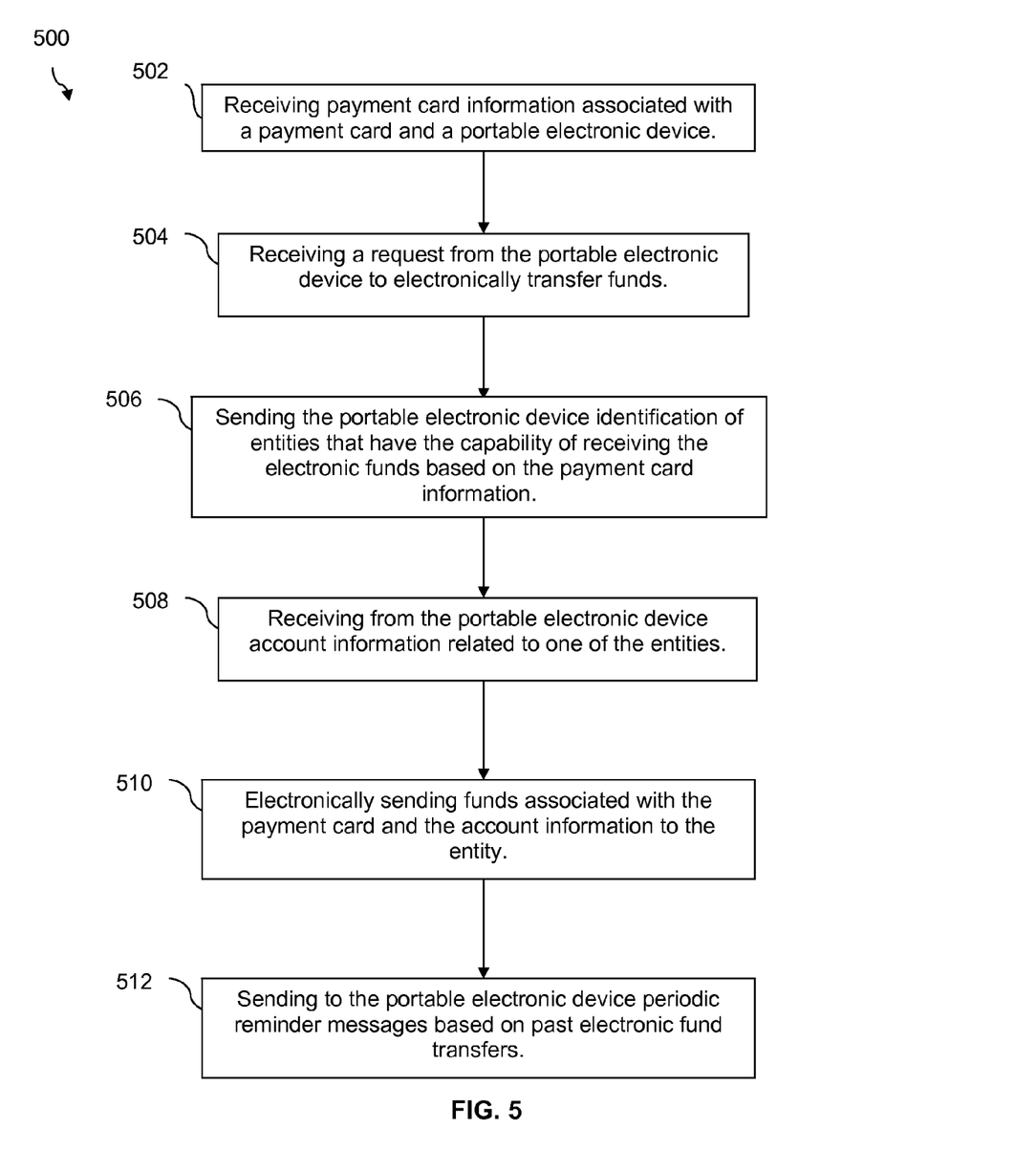
FIG. 5 is a flowchart, according to an embodiment of the disclosure.

Now turning to FIG. 5, a flowchart 500 of an embodiment of the disclosure is illustrated. In block 502, an application 209 executing on system 208 receives payment card information associated with a payment card and a portable electronic device. Payment card information may include the payment card account number, an authentication code associated with the payment card, the expiration date of the payment card, the payment card holder's name, and/or the address with zip code associated with the payment card. The payment card may include a credit card, debit card, reloadable card, or something similar. In block 504, application 209 receives a request from portable electronic device 100 to electronically transfer funds. Application 209 then may send portable electronic device 100 a list of entities that have the capability of receiving the electronic funds based on the payment card information, as shown in block 506. The payment card information may include the address of the account associated with the payment card or the zip code associated with the payment card account holder. Thus, in an embodiment, the portable electronic device 100 is sent by the application 209 a list of entities that may receive electronic funds based on the address of the account holder of the payment card or the zip code of the account holder of the payment card.

The method continues in block 508 in which application 209 may receive from portable electronic device 100 account information related to one of the entities. In block 510, application 209 may electronically send funds associated with the payment card and the account information related to one of the entities to the entity. The application 209 may then send periodic reminder messages to portable electronic device 100 based on past electronic fund transfers. As mentioned previously, the messages may be text messages, voice messages, or e-mails. This enables the application 209 to send the user of portable electronic device 100 reminders that previous payments have been made and that a new payment may be coming due.

Figure 6:
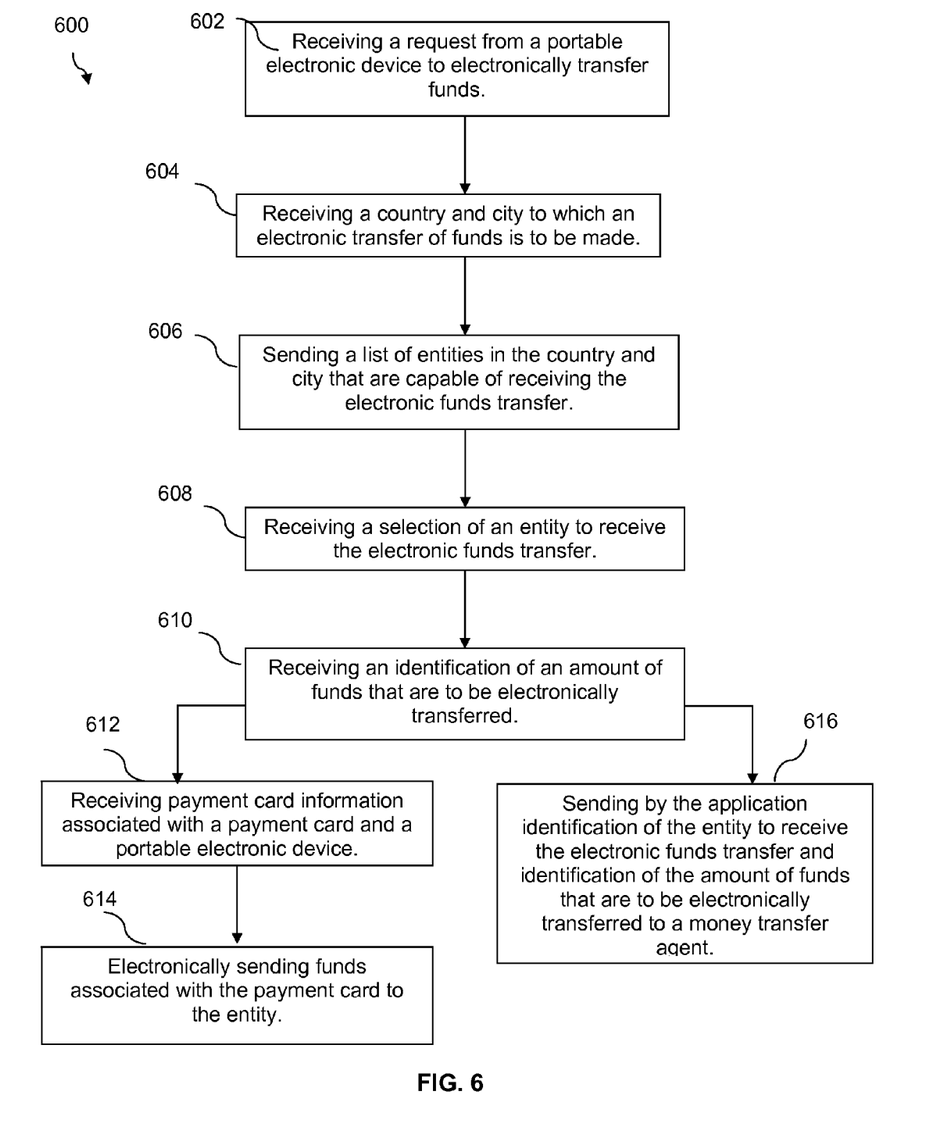
FIG. 6 is a flowchart, according to an embodiment of the disclosure.

FIG. 6 illustrates a flowchart 600 of an embodiment of the present disclosure. In block 602, application 209 receives a request from portable electronic device 100 to electronically transfer funds. The portable electronic device 100 may be assigned to a prepaid device plan with a mobile service provider. In block 604, application 209 receives a country and a city to which an electronic transfer of funds is to be made. Application 209 then may send a list of entities in the country and city that are capable of receiving the electronic funds transfer, as shown in block 606.

The method continues in block 608, in which application 209 receives an identification of an entity to receive the electronic funds transfer from portable electronic device 100. In block 610, application 209 receives an identification of an amount of funds that are to be transferred. Application 209 may receive payment card information associated with a payment card and portable electronic device 100, as shown in block 612. The payment card may be a credit card, debit card, or any other reloadable card. Application 209 then may electronically send funds associated with the payment card to the entity, as shown in block 614. This may be accomplished by application 209 triggering or sending messages which result in the transfer of funds. In an alternative embodiment, application 209 may send a command to a financial institution with appropriate authentication tokens and/or authorization tokens. The financial institution may then directly transfer the funds electronically to the entity. As shown in block 616, application 209 may also send the entity to receive the electronic funds transfer and the amount of funds that are to be electronically transferred to a money transfer agent, for example Western Union.

Figure 7:
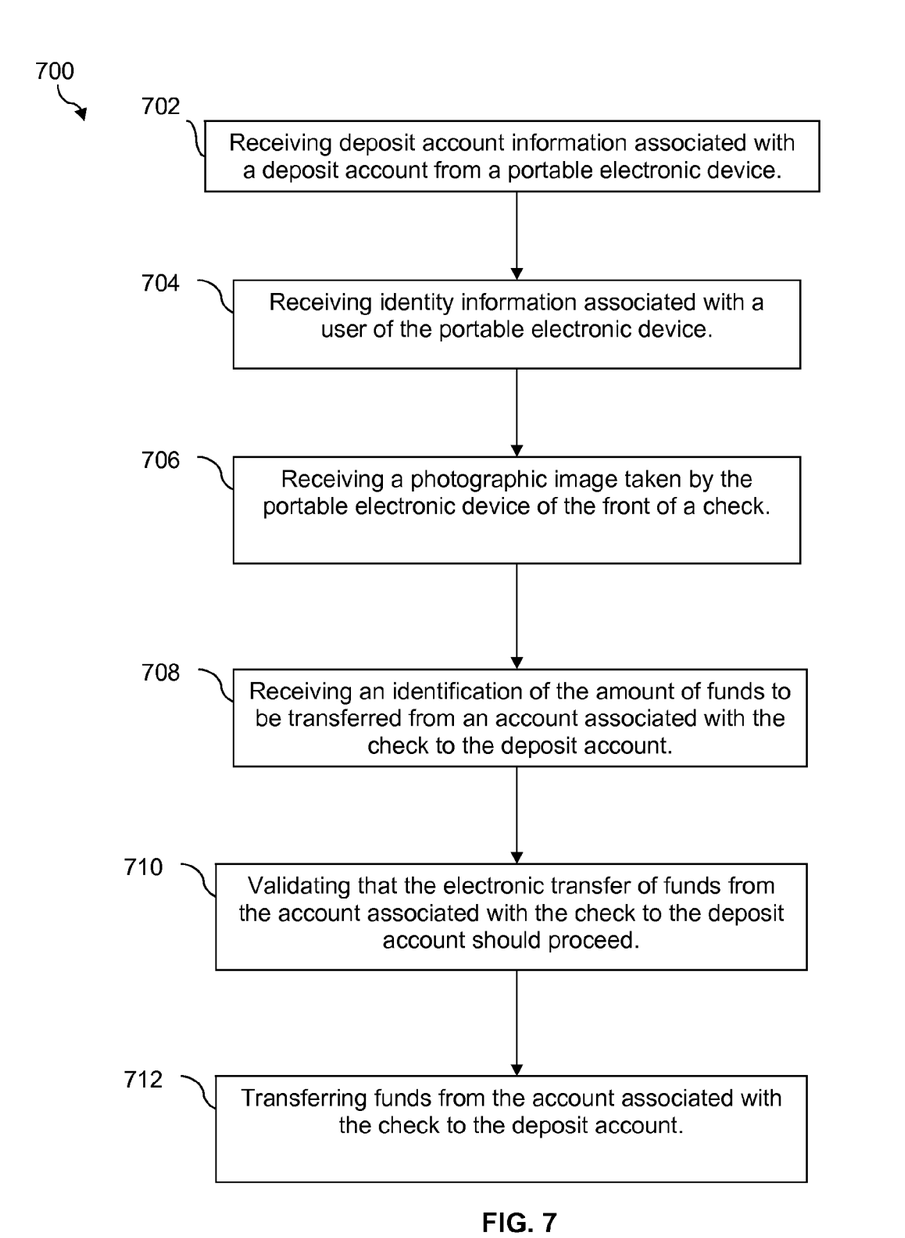
FIG. 7 is a flowchart, according to an embodiment of the disclosure.

In FIG. 7, a flowchart 700 of an embodiment of the present disclosure is illustrated. In block 702, application 209 may receive deposit account information associated with a deposit account from portable electronic device 100. The deposit account may include a bank account, such as a checking account or a savings account, a credit card account, a debit card account, or a reloadable card account. The deposit account information may include the deposit account number, the routing number of the financial institution in which the deposit account exists, an authentication code associated with the deposit account, the expiration date of the deposit account (if the deposit account is a credit card account, debit card account, or reloadable card account), the deposit account holder's name, and/or the address with zip code associated with the deposit account. Application 209 may also receive identity information associated with a user of portable electronic device 100, as shown in block 704. In block 706, application 209 receives a photographic image taken by portable electronic device 100 of the front of a check. The image may include an image of the routing number and account number printed on the check.

In block 708, application 209 may receive an identification of an amount of funds to be transferred from an account associated with the check to the deposit account. Application 209 may then validate that the electronic transfer of funds from the account associated with the check to the deposit account should proceed, as shown in block 710. In block 712, application 209 may transfer funds from the account associated with the check to the deposit account. This may be accomplished by application 209 triggering or sending messages which result in the transfer of funds. In an alternative embodiment, application 209 may send a command to a financial institution with appropriate authentication tokens and/or authorization tokens. The financial institution may then directly transfer the funds electronically to the deposit account.

Figure 8:
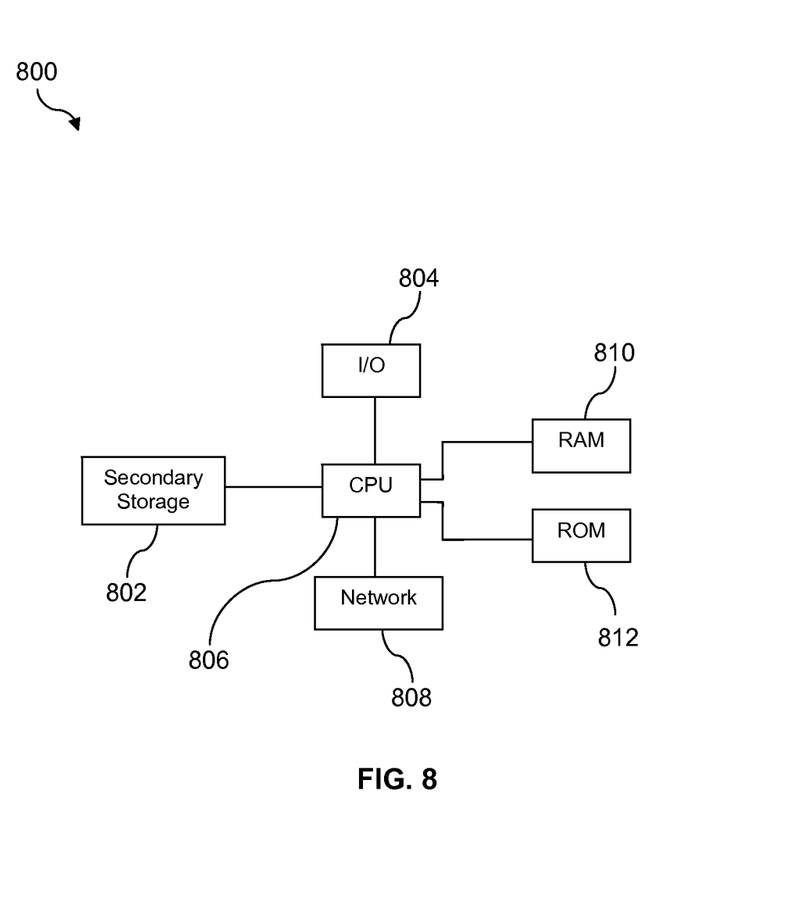
FIG. 8 illustrates an exemplary computer system, according to an embodiment of the disclosure.

FIG. 8 illustrates a computer system 800 suitable for implementing one or more embodiments disclosed herein. The computer system 800 includes a processor 806 (which may be referred to as a central processor unit or CPU) that is in communication with memory devices including secondary storage 802, read only memory (ROM) 812, random access memory (RAM) 810, input/output (I/O) devices 804, and network connectivity devices 808. The processor 806 may be implemented as one or more CPU chips.

It is understood that by programming and/or loading executable instructions onto the computer system 800, at least one of the CPU 806, the RAM 810, and the ROM 812 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 802 is typically comprised of one or more disk drives or tape drives and is used for non-volatile storage of data and as an over-flow data storage device if RAM 810 is not large enough to hold all working data. Secondary storage 802 may be used to store programs which are loaded into RAM 810 when such programs are selected for execution. The ROM 812 is used to store instructions and perhaps data which are read during program execution. ROM 812 is a non-volatile memory device which typically has a small memory capacity relative to the larger memory capacity of secondary storage 802. The RAM 810 is used to store volatile data and perhaps to store instructions. Access to both ROM 812 and RAM 810 is typically faster than to secondary storage 802.

I/O devices 804 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 808 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 808 may enable the processor 806 to communicate with the Internet or one or more intranets. With such a network connection, it is contemplated that the processor 806 might receive information from the network, or might output information to the network in the course of performing the above-described method steps. Such information, which is often represented as a sequence of instructions to be executed using processor 806, may be received from and outputted to the network, for example, in the form of a computer data signal embodied in a carrier wave.

Such information, which may include data or instructions to be executed using processor 806 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 806 executes instructions, codes, computer programs, scripts which it accesses from hard disk, floppy disk, optical disk (these various disk based systems may all be considered secondary storage 802), ROM 812, RAM 810, or the network connectivity devices 808. While only one processor 806 is shown, multiple processors may be present. Thus, while instructions may be discussed as executed by a processor, the instructions may be executed simultaneously, serially, or otherwise executed by one or multiple processors.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 802, to the ROM 812, to the RAM 810, and/or to other non-volatile memory and volatile memory of the computer system 800. The processor 806 may process the executable instructions and/or data in part by directly accessing the computer program product, for example by reading from a CD-ROM disk inserted into a disk drive peripheral of the computer system 800. The computer program product may comprise instructions that promote the loading and/or copying of data, data structures, files, and/or executable instructions to the secondary storage 802, to the ROM 812, to the RAM 810, and/or to other non-volatile memory and volatile memory of the computer system 800.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of enabling electronic transfer of funds, comprising:
   receiving, by an application executing on a computer, a first request from a portable electronic device to electronically transfer funds, wherein the portable electronic device is assigned to a prepaid mobile service plan with a mobile service provider;
   receiving, by the application, a country and city to which an electronic transfer of funds is to be made from the portable electronic device;
   sending, by the application, a list of entities in the received country and city that are capable of receiving the electronic funds transfer to the portable electronic device, wherein the list of entities comprises at least one utility;
   receiving, by the application, a selection of an entity from the list of entities to receive the electronic funds transfer from the portable electronic device;
   receiving, by the application, payment card information associated with a payment card, wherein the payment card information comprises a zip code;
   receiving, by the application, a second request from the portable electronic device to electronically transfer funds;
   sending, by the application, a list of utilities that service the zip code in which the payment card is registered to the portable electronic device;
   receiving, by the application, a selection of a utility from the list of utilities to receive the electronic funds transfer from the portable electronic device; and
   subsequently electronically transferring, by the application, an amount of funds to the selected utility.

2. The method of claim 1, further comprising receiving, by the application, identification of the amount of funds that are to be electronically transferred to the selected utility.

3. The method of claim 1, wherein the amount of funds is associated with the payment card.

4. The method of claim 1, further comprising sending, by the application, identification of the selected entity and identification of an amount of funds that are to be electronically transferred to the selected entity to a money transfer agent.

5. The method of claim 1, wherein the payment card is a credit card.

6. The method of claim 1, wherein the zip code is associated with a payment card account holder's residence.

7. The method of claim 1, further comprises receiving, by the portable electronic device, from the application, periodic reminder messages based on past electronic fund transfers.

8. The method of claim 1, wherein the first request is to electronically transfer funds from a prepaid account associated with the prepaid mobile service plan.

9. The method of claim 1, wherein the portable electronic device is a feature phone.

10. The method of claim 1, wherein the payment card is a debit card.

11. The method of claim 1, wherein the portable electronic device contains an area code associated with a first area, wherein the list of utilities presented to the portable electronic device are from a second area, and wherein the first and second areas are different.

12. The method of claim 1, wherein the payment card information further comprises an address of an account holder of the payment card.

13. The method of claim 1, further comprising storing the payment card information in memory.

14. The method of claim 13, further comprising using the payment card information to respond to a subsequent request to transfer funds from the portable electronic device.

15. The method of claim 1, further comprising receiving, by the application, account information related to the selected utility from portable electronic device.

16. The method of claim 15, further comprising sending, by the application, the account information to the selected utility along with the amount of funds.

17. The method of claim 1, wherein the second request is to electronically transfer funds from a prepaid account associated with the prepaid mobile service plan.

18. The method of claim 1, further comprising transferring funds associated with the payment card to the selected entity.

19. The method of claim 1, further comprising:
   receiving, by the application, identity information associated with a user of the portable electronic device, wherein the identity information comprises an address of the user; and
   performing a background check on the identifying information.

* * * * *